Dec. 4, 1934. E. KOENEMANN 1,982,672
PROCESS FOR THE SIMULTANEOUS GENERATION
OF COLDNESS AND STEAM UNDER PRESSURE
Filed April 15, 1931
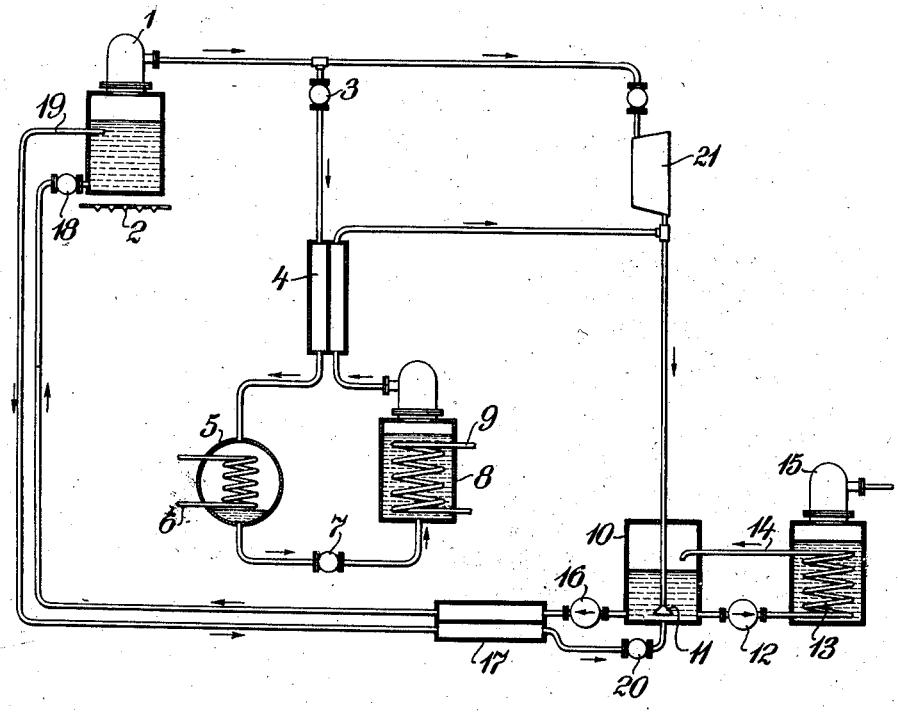
Inventor
Ernst Koenemann
By Emery, Booth, Varney & Holcombe
his Attorneys

UNITED STATES PATENT OFFICE 1,982,672

PROCESS FOR THE SIMULTANEOUS GENERATION OF COLDNESS AND STEAM UNDER PRESSURE

Ernst Koenemann, Halensee, near Berlin, Germany, assignor to Gesellschaft für Drucktransformatoren (Koenemann-Transformatoren) G. m. b. H., Berlin, Germany, a corporation of Germany Application April 15, 1931, Serial No. 530,418
In Germany April 24, 1930

21 Claims. (Cl. 62—179)

The cyclic processes for the generation of coldness according to the absorption method hitherto known suffer from the drawback that the heat liberated in the absorber must be transmitted to cooling water, so that large amounts of heat get lost. The object of the present invention is to obviate that loss, and I attain the object in view by making use of an auxiliary liquid (for instance zinc chloride di-ammoniacate) which binds the carrier of coldness that is the gas or the vapour to be absorbed at a high temperature and in utilizing the heat liberated in the absorber for the generation of steam under pressure.

In order to make the description of my invention more clear, I refer to the accompanying drawing in which is shown diagrammatically and by way of example a plant so designed as to be capable of operating according to my improved process.

On that drawing 1 denotes a vessel containing the auxiliary liquid, for example, a mixture of molten zinc chloride di-ammoniacate ($ZnCl_2(NH_3)_2$) and zinc chloride mon-ammoniacate ($ZnCl_2NH_3$). I term this vessel "expeller". The temperature of the liquid amounts to about 840° F. and it is under a pressure of about 170 lbs./sq. in. The zinc chloride di-ammoniacate is partly decomposed by the heat produced in the furnace 2 into zinc chloride mon-ammoniacate and ammonia vapor, the latter having the temperature of 840° F. and the pressure of about 170 lbs./sq. in. It passes through the shutting-off valve 3 to the heat-exchanger 4 where its temperature is reduced to about 120° F. and then to the condenser 5 where it is condensed. The latent heat is extracted by means of the coiled cooling tube 6. The liquid ammonia has a temperature of about 85° F., it passes through the throttle valve 7 into the evaporator 8 in which it is again evaporated under a low pressure, for instance of 3 atm. abs. and at a temperature of 15° F. The evaporation heat therefore required represents the coldness output of the plant and can be abstracted either from the heat of the surroundings or from a liquid flowing through the heating coil 9 and being cooled down in the same. According to the desired temperature of the coldness output the pressure in the evaporator 8 will be different; the lower the pressure is, the lower will be the temperature of the evaporating ammonia, and thus also the temperature of the generated coldness. The ammonia vapor escaping from the evaporator 8 is reheated in the heat exchanger 4 by means of the hot ammonia coming from the expeller 1 according to the preceding cooling (if, for instance, the temperature in the evaporator 8 amounts to 15° F. the ammonia vapor would be heated to 735° F.) and is then conducted to the absorber 10. In this it comes in contact with a liquid mixture of zinc chloride mon-ammoniacate and zinc chloride di-ammoniacate (distributor 11) i. e. the same auxiliary liquid as in the expeller, only its content of di-ammoniacate is greater because the ammonia is absorbed in the absorber as fast as liquid weak in diammoniacate is brought thereto as hereinafter described, while ammonia is driven out of the liquid in the expeller as fast as liquid strong in diammoniacate is introduced thereto, and at such ratios that in operation the liquid in the absorber, as an entire body, is stronger in diammoniacate than the liquid in the expeller, as an entire body. The liquid in the absorber is conveyed in a circuit through the pump 12, the worm pipe 13, and the tube 14. The worm-pipe 13 is cooled by means of water of about 590° F. so that the temperature of the liquid is maintained at about 660° F. At this temperature the liquid binds the ammonia introduced into the absorber at the pressure of 42 lbs./sq. in., whereby the mon-ammoniacate is partly converted into di-ammoniacate and the heat of association is available. This heat is transmitted to the evaporator 15 producing therein steam of say 1400 lbs./sq. in.

In order to maintain a constant mixture of zinc chloride mon-ammoniacate and zinc chloride di-ammoniacate in the expeller 1 and in the absorber 10 both these vessels are connected by means of a pipe circuit. The liquid of the absorber 11 is conducted by means of the pump 16 into the heat-exchanger 17 and further through the throttle or boiler check valve 18 into the expeller 1, whereas at the same time a corresponding amount of liquid flows back through the pipe 19, the heat exchanger 17 and the throttle valve 20 to the absorber 10.

Owing to the use of the heat exchanger 4 the efficiency of the plant is considerably increased; without the heat exchanger the amount of heat exchanged in it would be transmitted to the cooling water of the condenser 5 and would, therefore, be uselessly conducted away, while now that amount of heat is liberated in the absorber 10 and is utilized for the generation of high pressure steam, as in the evaporator 15.

If this steam is used as source of power, but besides this amount of power available by that steam an additional amount of power is needed, or if the generation of power and the generation of cold are to be compensated relatively to one another for the purpose of regulating the load, an ammonia vapor turbine 21 may be arranged between the expeller 1 and the absorber 10 in the coldness-producing plant (4, 5, 6, 7, 8, 9), that turbine being arranged in parallel with this plant; so that the ammonia vapor produced in the expeller 1 may be used partly or wholly either in that coldness-producing plant or in the said turbine by suitably regulating the flow of vapor by any suitable means, as by the control valves 3 and 22, for example.

It is no departure from the invention to employ the steam generated in the evaporator 15 not only for the generation of power, but also for other purposes, as for instance the heating of apparatus of various kinds.

I claim:

1. The method of generating coldness and steam under pressure consisting in subjecting molten zinc chloride ammoniacate to a high temperature to decompose it under pressure into gasiform ammonia and a second zinc chloride ammoniacate with a lower content of ammonia, usefully extracting sensible heat from the gasiform ammonia, condensing said ammonia by extracting latent heat, evaporating it under reduced pressure so as to produce coldness, usefully extracting sensible heat from the second zinc chloride ammoniacate, introducing the evaporated ammonia into the second zinc chloride ammoniacate to re-form said first zinc chloride ammoniacate, usefully extracting the heat developed by the re-combination to generate steam under pressure, and returning said reformed zinc chloride ammoniacate for re-decomposition.

2. The method of generating coldness and steam under pressure comprising the steps defined in claim 1 and further consisting in reheating the evaporated ammonia before introducing it into the second zinc chloride ammoniacate, by the sensible heat usefully extracted from the gasiform ammonia, that this heat may be applied, with the heat developed by the re-combination, in the generation of steam under pressure.

3. The method of generating coldness and steam under pressure comprising the steps defined in claim 1 and further consisting in compensating for variation in demand for gasiform ammonia for the production of cold by separating the excess ammonia from that to be used in the production of cold and independently usefully extracting heat therefrom and thereafter introducing the same into the second zinc chloride ammoniacate to recombine therewith.

4. The method of generating coldness and steam under pressure comprising the steps defined in claim 1 and further consisting in compensating for variation in demand for gasiform ammonia for the production of cold by employing excess ammonia resulting from the decomposition of the first zinc chloride ammoniacate as a motive fluid for the production of power and thereafter introducing the same into the second zinc chloride ammoniacate to recombine therewith.

5. The method of generating coldness and steam under pressure consisting in subjecting a water-free liquid dissociable chemical compound such as molten zinc chloride ammoniacate to a high temperature to decompose it under pressure into a gasiform coldness carrying agent and a water-free liquid decomposition resultant, such as gasiform ammonia and a second zinc chloride ammoniacate with a lower content of ammonia, usefully extracting sensible heat from the gasiform agent, condensing said agent by extracting latent heat, evaporating it under reduced pressure so as to produce coldness, usefully extracting sensible heat from the water-free liquid decomposition resultant, introducing the evaporated agent into the water-free liquid decomposition resultant to re-form said first water-free liquid compounds, usefully extracting the heat developed by the re-combination to generate steam under pressure, and returning said reformed water-free liquid compound for re-decomposition.

6. The method of generating coldness and steam under pressure comprising the steps defined in claim 5 and further consisting in reheating the evaporated agent before introducing it into the water-free liquid decomposition resultant, by the sensible heat usefully extracted from the gasiform agent, that this heat may be applied, with the heat developed by the re-combination, in the generation of steam under pressure.

7. The method of generating coldness and steam under pressure comprising the steps defined in claim 5 and further consisting in compensating for variation in demand for gasiform agent for the production of cold by separating the excess thereof from that to be used in the production of cold and independently usefully extracting heat therefrom and thereafter introducing the same into the water-free liquid decomposition resultant to recombine therewith.

8. The method of generating coldness and steam under pressure which consists in dissociating an auxiliary liquid at a high temperature approximating 840° F. and a low pressure approximating eleven atmospheres absolute to obtain directly in superheated condition therefrom a gasiform coldness carrying agent at such temperature and pressure: usefully extracting heat from said superheated gasiform coldness carrying agent to reduce its temperature by approximately 700° F. and then further extracting heat therefrom to condense it at its said initial pressure; thereafter expanding the said condensed coldness carrying agent to a still lower pressure approximating three atmospheres absolute to produce coldness and convert said coldness carrying agent by evaporation into a gas at said pressure and of a low temperature approximating 15° F.; then reheating said gas at said pressure of evaporation by the heat extracted from it before condensation to thus raise its temperature by approximately 700° F.: withdrawing auxiliary liquid from which said coldness carrying agent has been dissociated at the temperature and pressure of dissociation; usefully extracting heat from such withdrawn liquid to reduce its temperature, and reducing the pressure on said liquid to a pressure of approximately three atmospheres absolute: bringing together said reheated coldness carrying agent and dissociated auxiliary liquid of reduced temperature and pressure to reform dissociable auxiliary liquid and render available heat of recombination at said low pressure; withdrawing heat from said recombined liquid to evaporate water at about 600° F. and produce steam therefrom of about ninety atmospheres pressure: and returning the thus cooled recombined liquid for redissociation, raising its pressure to approximately eleven atmospheres during such return, and adding thereto during such return the heat usefully extracted from the said withdrawn liquid: substantially as and for the purposes described.

9. The method of generating coldness and steam under pressure which consists in dissociating an auxiliary liquid at a temperature above the critical temperature of water and a corresponding medium pressure to obtain directly in superheated condition therefrom a gasiform coldness carrying agent at such temperature and pressure: usefully extracting heat from said superheated gasiform coldness carrying agent and condensing it at said initial pressure; thereafter expanding the said coldness carrying agent to a still lower pressure to produce coldness and convert said coldness carrying agent by evaporation into a low temperature gas at said pressure: withdrawing auxiliary liquid from which said coldness carrying agent has been dissociated at the pressure and temperature of dissociation; reducing the temperature and pressure on said withdrawn liquid to condition it for recombination with coldness carrying agent to re-form dissociable auxiliary liquid: bringing together said evaporated coldness carrying agent and conditioned dissociated auxiliary liquid to reform dissociable auxiliary liquid and render available heat of recombination at low super-atmospheric pressure, withdrawing heat from said recombined liquid to evaporate water at high temperature and high super-atmospheric pressure: and returning the thus cooled recombined liquid for redissociation, raising its pressure to the pressure of dissociation during such return: substantially as and for the purposes described.

10. A process of obtaining extremely low temperatures which comprises expanding ammonia in a closed system, maintaining a low pressure in said system by absorbing said ammonia in fused zinc chloride at a correspondingly low temperature, transferring the resulting zinc chloride solution to a generator where it is heated to a high temperature of the order of 850° to 950° F. at a pressure of about 10 to 12 atmospheres, whereby at least a part of the ammonia is expelled therefrom, condensing said ammonia and introducing said condensed ammonia into said expansion system, and returning the zinc chloride from the generator to absorb further amounts of ammonia from said expansion system.

11. A process of obtaining extremely low temperatures which comprises expanding ammonia in a closed system, maintaining a low pressure in said system by absorbing said ammonia in fused zinc chloride at a correspondingly low temperature, transferring the resulting zinc chloride solution to a generator where it is heated to a high temperature of the order of 850° to 950° F. at a pressure of about 10 to 12 atmospheres, whereby at least a part of the ammonia is expelled therefrom, usefully extracting heat from the expelled ammonia, condensing said cooled ammonia and introducing said condensed ammonia into said expansion system, and returning the zinc chloride from the generator to absorb further amounts of ammonia from said expansion system.

12. An absorption refrigeration method comprising the steps of generating ammonia gas as hereinafter set forth, changing the generated ammonia to a more dense fluid phase, then expanding the ammonia to effect refrigeration, absorbing the used ammonia gas in a fused zinc chloride base absorbent, and then generating ammonia gas from said absorbent.

13. An absorption refrigeration method comprising the steps of generating a refrigerant gas as hereinafter set forth, changing the generated gas to a more dense fluid phase, expanding the refrigerant to effect refrigeration, absorbing the used refrigerant gas in a fused zinc chloride base absorbent, and then generating refrigerant gas from the said absorbent.

14. An absorption refrigeration method comprising the steps of generating a refrigerant gas as hereinafter set forth, changing the generated gas to a more dense fluid phase, expanding the refrigerant to effect refrigeration, absorbing the used refrigerant gas in a fused absorbent having as a base a metal salt such as zinc chloride, and then generating refrigerant gas from the said absorbent.

15. An absorption refrigeration method comprising the steps of generating ammonia gas as hereinafter set forth, changing the generated ammonia to a more dense fluid phase, then expanding the ammonia to effect refrigeration, absorbing the used ammonia in an absorbent liquid having sufficient affinity for ammonia to maintain a low pressure of absorption, of the order of 1 atmosphere at 212° F. and 3 atmospheres at 600° F., and then generating ammonia gas at a higher pressure from said absorbent.

16. An absorption refrigeration method comprising the steps of generating ammonia gas as hereinafter set forth, changing the generated ammonia to a more dense fluid phase, then expanding the ammonia to effect refrigeration, absorbing the used ammonia gas in a liquid absorbent having as a base a metal salt such as zinc chloride which has a greater affinity for ammonia than that existing between ammonia and water, and then generating ammonia gas from said absorbent.

17. An absorption refrigeration method comprising the steps of generating a refrigerant gas as hereinafter set forth, changing the generated gas to a more dense fluid phase, expanding the refrigerant to effect refrigeration, absorbing the used refrigerant gas in a liquid absorbent having as a base a metal salt such as zinc chloride, and having, in liquid state, a lower vapor pressure than water, and then generating refrigerant gas from the said absorbent.

18. An absorption refrigeration cycle comprising the steps of generating a refrigerant gas as hereinafter set forth, changing the refrigerant gas to a more dense fluid phase, expanding the refrigerant to effect refrigeration, absorbing the used refrigerant gas in a molten absorbent having a metal salt base and maintained in liquid state throughout the cycle both while carrying the refrigerant and before absorption thereof, and then regenerating refrigerant gas from the said absorbent.

19. The method of producing refrigeration and useful heat which consists in producing a gaseous refrigerating medium, converting said gaseous refrigerating medium into a denser fluid phase, expanding the refrigerating medium to produce a refrigeration, absorbing the used gaseous refrigerating medium by means of an absorption agent, said absorption being effected at a higher temperature than the boiling point of water and substantially higher than the condensation of the gaseous refrigerating medium, utilizing the thereby released heat, and again securing the said gaseous refrigerating medium from the said absorption agent.

20. An absorption refrigeration and high temperature heat producing cycle comprising the steps of generating a refrigerant gas as hereinafter set forth, changing the refrigerant gas to a more dense fluid phase, expanding the refrigerant to effect refrigeration, absorbing the used refrigerant gas in an absorbent at a high temperature relative to the temperature at which the refrigerant is changed to its more dense fluid phase, said high temperature being of the order of several hundred degrees Fahrenheit, for example, usefully extracting the high-temperature heat released by the absorption, and then regenerating refrigerant gas from said absorbent.

21. Absorption refrigerating machine of the continuously operating type in which the absorption of the refrigerating agent is effected by the use of a liquid absorbent agent which enters into chemical combination with the refrigerating agent at elevated temperature, characterized by means whereby the heat quantities resulting from the condensation and absorption are conducted away at different non-adjacent temperature ranges.

ERNST KOENEMANN.